United States Patent [19]

Ornstern et al.

[11] Patent Number: 5,373,049
[45] Date of Patent: Dec. 13, 1994

[54] COOL MELT GLUE

[75] Inventors: Robert L. Ornstern, Key West, Fla.; Peter S. Melendy, Brentwood; Dennis J. Fitzmeyer, Epping, both of N.H.

[73] Assignee: Adhesive Technologies, Hampton, N.H.

[21] Appl. No.: 708,863

[22] Filed: May 31, 1991

Related U.S. Application Data

[62] Division of Ser. No. 224,384, Jul. 26, 1988, Pat. No. 5,041,482.

[51] Int. Cl.$^5$ .......................... C08J 5/10; C08K 5/01; C08L 91/08
[52] U.S. Cl. ................................. 524/487; 524/488; 524/489; 524/272; 524/274
[58] Field of Search ............... 524/487, 488, 489, 272, 524/274

[56] References Cited

U.S. PATENT DOCUMENTS

| | | | |
|---|---|---|---|
| 4,325,853 | 4/1982 | Acharya et al. | 524/272 |
| 4,404,299 | 9/1983 | Decroix, Jr. | 524/68 |
| 4,412,030 | 10/1983 | Runavot et al. | 524/505 |

Primary Examiner—Paul R. Michl
Assistant Examiner—U. K. Rajguru
Attorney, Agent, or Firm—Jacobson, Price, Holman & Stern

[57] ABSTRACT

Hot-melt adhesives, useful for both glue-pot and glue-gun applications, are formulated so that they can be applied at temperatures no higher than 280° F. and preferably at temperatures of at most 250° F. The adhesive compositions have a heat resistance of at least 125° F. and are readily shaped into glue sticks for use in glue guns, The adhesive for the hot-melt adhesive compositions is suitably compounded with tackifying resin and/or wax. The resulting composition has a sharp viscosity profile, which is readily achieved, e.g., by using a high melt index adhesive polymer as an essential component.

25 Claims, No Drawings

COOL MELT GLUE

This application is a division of application Ser. No. 224,384, filed Jul. 26, 1988 now 5,041,482.

FIELD OF THE INVENTION

A number of problems are encountered with conventional hot-melt glue because of the temperature to which such glue must be heated for use. All of the problems are overcome by glue which melts at a significantly lower temperature and yet does not materially sacrifice bonding properties.

BACKGROUND

Numerous problems are regularly encountered with use of conventional hot-melt glue. The temperature to which such glue must be heated (350° to 400° F.; 177° to 204° C.) virtually precludes battery (dry cell) operation. The high temperature corresponds to higher power consumption costs and longer preparation time; it also restricts the material from which the glue pot or other container can be constructed and thus increases cost in that respect as well.

All adhesives wet in two primary ways:
1) mechanical adhesion relates to microscopic surface roughness and penetration of adhesive into pores and irregularities on or wetting of a surface to which the adhesive is applied, and
2) chemical adhesion relates to polarity associated with adhesive and substrate, as well as free electron attraction on the adhesive and substrate surfaces.

Mechanical adhesion is generally from 2 to 10 times stronger than chemical adhesion for those substrates which have higher surface roughness, such as wood and paper. Even on smooth surfaces, such as those of hard plastic, mechanical adhesion is usually at least equal to chemical adhesion. Mechanical adhesion depends upon viscosity and surface tension of molten hot melt. As high viscosity and high surface tension are antagonistic to wetting, hot melts have been applied at as high a temperature as possible without degradation in order to reduce both of these properties.

One particular use of hot-melt adhesive has been in the form of glue sticks for glue guns. When conventional hot-melt glue is used in such glue sticks, the glue must be heated to a temperature which often burns the fingers of the glue-gun operator. The temperature, which necessitates higher-cost glue-gun components, is also sufficient to melt or otherwise impair materials to which the hot-melt glue is applied.

These problems could be overcome by a glue stick which has a lower application temperature. In this regard, investigations have been made for glue compositions having lower application temperatures. Unfortunately, such compositions have been found lacking in bonding strength. To improve bonding properties, attempts have been made to increase the viscosity of such low-melting compositions. This has proved ineffective.

In order to accommodate hot-melt glue sticks, conventional glue guns must have a metal barrel through which the glue stick is conducted. The cost of a glue gun could be materially reduced if it could be made completely from plastic materials. The latter would have a further advantage of reducing electrical conductivity.

There are many known hot-melt adhesives with melting points below 180° F. (82° C.) These were designed with various components, which made them, e.g., pressure-sensitive, like that used in making "Scotch" tape. Such adhesives are very soft and often exhibit cold flow. In general, they are designed for automated application from large industrial bulk melt systems. Others are designed for glue pot applications.

The glue gun was originally designed in the 1960's. Even today, it has nominal operating temperatures in the range of from about 177° to about 204° C. All hot-melt glue sticks for glue guns are designed for these conditions, and currently-available glue guns do not operate at temperatures below this range.

Traditional hot-melt adhesive (used as a shaped adhesive for glue guns) is composed of a mixture of adhesive polymer, tackifying resin and wax. The adhesive polymer generally has a melt index of from 1.5 to 550 g/10 min. (dg/min.) and a melting point of from 180° to 330° F. (82° to 166° C.) The adhesive polymer is optionally composed of any of a number of base materials, such as polyester, polyamide, polyethylene, and polypropylene. Although characteristics of each base material are different, their application temperatures and viscosities substantially parallel each other.

The most widely used polymer in hot melt formulations is ethylene/vinyl acetate (EVA), which (when combined with resin and wax) provides generally good bonds to a wide variety of substrates. However, such EVA compositions are viscous in nature, and the normal recommended application temperature range of from 300° to 450° F. (149° to 232° C.), preferably 375° F. (191° C.), is consequently much higher than the softening point of the formulations. The disparity between softening point and application temperature is one of the primary problems addressed by the subject invention.

Traditional hot-melt adhesives are based on medium and/or low melt-index polymer adhesive, which has a higher molecular weight and a higher viscosity than its high-melt-index polymer adhesive counterparts. The higher viscosity and higher molecular weight have been regarded as crucial even to achieve hot-melt compositions yielding a bond strength barely above 200 psi in adhesive tensile and 140° F. (60° C.) in heat resistance (with a dead hanging 2-pound weight).

When traditional hot-melt adhesive is modified with a low-melting point additive to formulate a reasonably useful low application temperature hot-melt, certain characteristics are necessarily sacrificed. To compound a hot-melt composition with a significantly lower application temperature without materially adversely altering set time and strength has been previously sought after in vain.

Generally marketed hot-melt glue EVA compositions have a heat resistance of approximately 145° F. (63° C.) and a somewhat higher ring and ball softening point with a viscosity at application temperature (350° F.; 177° C.) of anywhere from 1,000 cp to 50,000 cp. Loading a composition with inert filler or using lower melt index EVA (with a much higher viscosity) to achieve higher heat resistance has resulted in raising the application temperature as well as the pressure required to extrude the resulting formulation from an applicator; such formulations result in a heat resistance gain of only about 10° or 15° F. (5.5° or 8.5° C.), but the application temperature must be raised approximately another 50° F. (28° C.)

There are many applications for bonding that do not require a heat resistance of 145° F. (63° C.) Many substrates, such as polystyrene foam and polyethylene film, cannot resist an application temperature of from 350° to 450° F. (177° to 232° C.)

Although the title of this application is COOL MELT GLUE, the compositions and their applications are still recognized as those of hot-melt adhesives. References herein to hot-melt glue thus do not necessarily distinguish over features of this invention.

In considering differences in properties, e.g. bond strength, between typical conventional hot-melt based glue sticks for glue guns and cool-melt based glue sticks of the subject invention, the particular substrate involved is a significant factor. Typical adhesive tensile strengths (adapted from ASTM D-1002 modified) [bond strength (in psi) data] for conventional hot-melt based glue sticks and cool-melt glue sticks are provided for a variety of substrates:

| Subtrate | Hot Melt | Cool Melt |
| --- | --- | --- |
| G-10 Phenolic | 190 | 270–340 |
| ABS | 60 | 80–120 |
| Nylon | 35 | 140–200 |
| Polycarbonate | 60 | 130–180 |
| Polypropylene | 60 | 120–170 |
| Styrene | 30 | 50–80 |

As readily appreciated from this table, the respective bond strengths achieved with the cool-melt glue are in excess of those obtained with a typical hot-melt glue by at least 30 percent. Bond strengths of that order of magnitude above those obtained with typical hot-melt glue sticks are regarded as excellent bond strengths.

In the preceding table the typical values for traditional hot-melt adhesives are obtained by applying the adhesive at 350° F. (177° C.), whereas the values reflected for the cool-melt glue are obtained by applying that glue at 200° F.(93° C.) There are traditional hot-melt adhesives which have competitive bond strength values, and some high performance cool-melt formulas which exceed the recited bond strength ranges. These are generally considered to be specialty hot melts intended for high bond strength applications and are exceptional.

Traditional hot-melt adhesives are frequently processed in melt kettles or reactors at temperatures around 350° F. (177° C.) Such temperatures are required by the melt index and the melting point of materials in the hot-melt adhesive blend. At those temperatures certain volatiles in employed tackifier resins gas off and begin to degrade. Over an extended period of time, e.g. about 12 hours, the resulting degradation produces a darkening in color. Char, also due to the degradation, occurs on the inside of the reactors.

In view of the temperatures involved, serious burns result when the molten material is handled carelessly. The high process temperatures also require use of a hot oil system to heat the reactors to 300° to 350° F.; the oil has to be heated to about 400° to 450° F. (204° to 232° C.) This type of process thus requires a sophisticated heating system and large amounts of energy; processing 8000 pounds per day requires 70,000 BTU/hr. Moreover, the work environment includes constant heat with a temperature of about 135° F. (57° C.) near the work area at the top of the reactors.

In contrast, a normal processing temperature for cool-melt glue is in the range of from 200° to 230° F. (93° to 110° C.) This fact alone provides a number of advantages. The kettle or reactor temperatures are low enough to eliminate almost all char and are also below the vaporization temperature of resin volatiles. The operating temperature also reduces or eliminates any short term degradation and hot-melt darkening. Handling problems are far less serious and virtually eliminate any serious burns. Environmentally, problems relating to produced vapors are eliminated. Also, it is likely that hot-oil heating can be replaced by steam or electric heating; this will reduce costs and safety risks inherent in a hot-oil heating system.

Traditional hot-melt adhesives are normally applied at a temperature between 350° and 400° F. (177° and 204° C.) This application temperature is needed to provide a low enough melt viscosity to ensure good wetting of the substrates and adequate open (work) time to position the several elements involved after glue is applied to them. Even pressure-sensitive hot-melts (hot-melts which have continuous tack even at room temperature) often have to be applied at 350° F. (177° C.) because their viscosity is too high to be applied effectively at lower temperatures.

Specific problems occur at the noted application temperature range. Traditional hot-melts char and darken within the noted range in the same manner as during processing. The char can clog nozzles, and bond strengths decline as tackifiers degrade. Some tackifiers contain residual volatiles which will out-gas and cause bubbles of gas in the hot melt. This interferes with nozzle shutoff, as bubble pressure lifts (opens) the nozzle valve and results in a leaking nozzle. Since many of the produced gases are acidic, they can attack some applicator (glue gun) components, such as the silicone sleeve and seals, reducing their durability. The same safety issues remain; as a worker must apply glue to and handle glued items, there is a continual risk of incidental or consequential burns.

When hot-melt or cool-melt glue sticks are prepared for glue guns, the application temperature is a material factor. The outside handle set of the glue gun must be designed to limit the outside surface temperature. The location of the casting must be far enough away from the hand to prevent the handle area from being "too hot to handle". U.L. certification also requires that material used in the handle set be adequate to withstand the temperatures involved at the casting area (the highest temperature region). Such material tends to be more expensive and harder to mold than less sophisticated materials certified for use in lower temperature applications. Some of the materials, such as the silicone used in the sleeve, have reduced ratings at the in-use temperature of 400° F. and thus reduced durability. Alternative choices are limited.

A temperature gradient from 400° to 75° F. (204° to 24° C.) exists. This temperature transition occurs between the casting and the end of the silicone sleeve in a glue gun. Over the involved distance glue goes from molten to solid. The required length over which this change occurs is from about one inch to about 1.5 inches, depending upon the glue formula and the casting temperature. Under long-term steady-state operation there is molten glue within the sleeve area. When the glue gun is unplugged and cooled, molten glue in the sleeve hardens. Upon reheating, the glue does not feed through the sleeve until thus hardened glue is re-softened. Heat must migrate from the casting into the sleeve area, which requires time and extends the period before which the glue gun is capable of feeding a glue stick through the sleeve. The shorter the transition distance, the quicker the glue gun is ready to use.

With conventional hot-melt glue stick compositions additional problems arise with regard to glue-stick feeding in a glue gun. Even though a silicone sleeve provides means for the glue to go from liquid to solid, convective heat from the casting (the glue stick) flows toward the rear of the sleeve, and air at the entrance to the sleeve can be at a temperature of from 100° to 120° F. (38° to 49° C.) This temperature is often sufficient to soften glue-stick formulations, which thus become subject to jamming in the feeding mechanism or, in the extreme, actually become semi-liquid. When a glue-stick durometer reading drops to less than a Shore "A" hardness of 35, such feeding problems regularly occur with conventional feed mechanisms. The correlation between hardness and glue-stick temperature is reasonably linear.

The cool-melt glue formulations of this invention eliminate most of the previously-noted problems. Their application temperature is normally within the range of from 180° to 230° F., (82° to 110° C.), which reduces or eliminates the generation of char and at least retards any possible degradation. Most of the tackifiers used in cool-melt glue formulations are the same as those used in traditional hot-melt glue formulations. Their degradation is directly related to the production and application temperatures, as with almost all oxidation reactions. The cooler casting temperatures for the cool-melt formulations also eliminate the out-gassing problems, as volatiles in the tackifying resins usually do not vaporize below 300° F. (149° C.) With a casting temperature of 200° F. (93° C.) available certified materials for use in glue guns are more numerous and less expensive. There is greater latitude in glue gun design because the user does not have to be protected from high temperatures. A glue gun can be designed with its handle grip area much closer to the casting than is possible with conventional glue guns. The hand grip area of a glue gun can even surround the casting; it can resemble a syringe having a glue stick as its plunger. At 200° F. (93° C.) cool-melt formulations have few dangerous handling problems; in fact, only slight discomfort would be encountered when such cool-melt is applied directly to an unprotected hand. At a casting temperature of 200° F. (93° C.) materials, such as silicone, are well below their rated temperature limits and are extremely durable.

The temperature gradient with cool-melt glue stick formulations is from 230° to 75° F. (110° to 24° C.) While there is still a transition from molten glue to solid glue, the temperature range and the required distance are significantly reduced. The distance needed is only from about 0.1 to 0.4 of an inch, even under steady-state heated conditions. As a result there is almost no delay in the start-up of a glue gun because the glue stick can feed as soon as the casting is at temperature; heat does not have to migrate far into the sleeve. Additionally, convective heat from the glue-stick casting has almost no impact upon the temperature of the air at the entrance of the silicone sleeve. Feeding problems are thus reduced, as the glue sticks are not exposed to air temperatures, which could lower their durometer readings significantly below values at ambient temperature.

SUMMARY OF THE INVENTION

High-melt-index (above 750 g/10 min.) polymers, particularly EVA polymers which have been readily available for several years, provide an excellent material for low-melt temperature glue sticks and for low-melt temperature glue pot operations. While these polymers melt at slightly lower temperatures than previously-existing EVA's, their viscosity profile is much sharper and drops very quickly with increased temperature. Rather than having increased viscosity, as previously sought by artisans to attain adequate heat resistance, they thus have a lower viscosity than their conventional hot-melt counterparts. Moreover, bonding characteristics are not materially sacrificed by their use.

Low-melt glue sticks formulated with these EVA's or other high-melt-index adhesive polymer are applied at about 200° F. (about 93° C.) with excellent bond strengths. Another surprising attribute of the high-melt-index adhesive polymer, e.g. EVA's, is that their heat resistance (130° to 135° F.; 54° to 57° C.) is only about 10° to 15° F. (5.5° to 8.5° C.) below that (140° to 155° F.; 60° to 68° C.) of traditional glue sticks despite the fact that their application temperature is from 150° to 200° F. (83° to 111° C.) cooler. The net performance loss from the high-melt-index adhesive polymers is thus minimal.

The potential hazards of conventional glue guns have prevented their use in schools and in homes of safety-conscious people. Heat-sensitive materials, like styrofoam and thin polyethylene (P/E) films, melt when traditional hot-melt glue is applied to them, and hot-melts are almost impossible to use for gluing such materials. As cool-melt EVA's can be applied at about 200° F. (within a range of from 180° to 235° F.), corresponding to 93° C. (within a range of from 82° to 113° C.), they are thus useful on even heat-sensitive substrates. At this application temperature they are not likely to cause significant discomfort even when applied directly onto fingers from a glue gun. The lower operation temperature makes it possible to use less expensive glue gun materials without sacrificing safety.

Objects of this invention include:
a) Obtaining a hot-melt glue composition which is readily applicable at a temperature significantly lower than that of conventional hot-melt glue compositions without materially sacrificing bond-strength properties.
b) Obtaining a hot-melt glue composition which is less expensive to prepare and/or process.
c) Obtaining a hot-melt glue composition which does not soften at ambient temperature.
d) Obtaining a hot-melt glue composition which can be applied at a temperature which does not burn skin.
e) Developing a hot-melt formulation for a glue-gun glue stick with a heat resistance of a minimum of 125° F. (51.5° C.), and higher if possible, and with an application temperature (from a glue dispensing gun) of at most 280° F. (138° C.), preferably 250° F. (121° C.), or lower.
f) Developing a hot-melt formulation suitable for a battery-operated glue gun.

The preceding objectives are achieved without significantly altering a typical formulation for hot-melt adhesive. Such formulations traditionally comprise from 20 to 80 parts by weight of adhesive polymer, from 0 to 60 parts by weight of tackifying resin and from 0 to 30 parts by weight of wax; the adhesive polymer is admixed with either or both of the other noted components to obtain a product having the desired viscosity and set time. The adhesive polymer is the key to the ultimate characteristics of the hot-melt glue composition.

By using an adhesive polymer having a melt index in excess of 750, preferably at least 2,000, g/10 min. (dg/min.), a hot-melt adhesive composition is readily obtained with an application temperature in an approximate range of from 180° to 250° F., (82° to 121° C.) whereas corresponding traditional hot-melt adhesive compositions (with adhesive polymers having a melt index below about 650 g/10 min.) have significantly higher application temperatures. Accordingly, the application temperature of a glue gun glue stick (having, as sole or primary adhesive component, an adhesive polymer with a melt index which is less than about 650 g/10 min. ) is reduced by replacing the adhesive polymer with one which has a melt index in excess of 750 g/10 min.

There are several distinct aspects of the present invention:

a) a hot-melt adhesive composition having an application temperature in an approximate range of from 180° to 250° F. and based upon an adhesive polymer preferably having a melt index in excess of 750 g/10 min.;

b) a shaped adhesive glue stick suitable for use in a glue gun and consisting essentially of composition (a);

c) a method of reducing the application temperature of a glue gun glue stick by using adhesive polymer which preferably has a melt index in excess of 750 g/10 min.; and d) a method of using adhesive polymer with a melt index in excess of 750 g/10 min. in compounding a hot-melt adhesive composition.

INTRODUCTION

Traditional hot-melt glue sticks are designed to provide good adhesion and to function well (feed well in and dispense well from) glue guns. That requires the glue sticks to be hard enough (have a Shore "A" durometer reading of from about 50 to 100) to allow them to be pushed into and through the glue gun, while maintaining adhesive characteristics for good hot-melt bonding when applied. Compounding traditional hot-melt formulations allows a significant amount of latitude because the generally-used materials have a low enough viscosity at a contemplated application temperature of 350° to 400° F. (177° to 204° C.) to allow them to be applied easily. The glue stick hardness is readily adjusted by the resin or wax content or with the melt index of the adhesive resin employed. An additional aspect of hot-melt bonding is heat resistance. Traditional hot-melt adhesives, e.g. EVA's, have a nominal heat resistance range of from 125° to 155° F. (52° to 68° C.) This target range does not pose a difficult formulation task because heat resistance can be improved by inclusion or substitution of higher melt point constituents or increasing nominal viscosity.

Lowering the application temperature of a hot-melt adhesive formulation, however, is no simple task. The mere substitution of constituents with a lower melting point may permit application at 200° F. (93° C.), but the heat resistance of the obtained product is likely to be unsatisfactorily low, probably less than 120° F. (49° C.) Also, the cohesive strength would be expected to be too low, as most low-melting materials have low molecular weights and limited toughness.

Critical factors in formulating cool-melt glue compositions involve maintaining cohesive strength without increasing melt viscosity. This has been achieved by using a high-melt-index adhesive polymer, such as EVA and P/E. Alternative approaches, including use of low melting point waxes or resins, reduce cohesive strength or make the resulting hot melt very crystalline and brittle. Additionally, the heat resistance has to be maintained at a temperature of at least 125° F. (52° C.) to meet the general needs of the marketplace. That requires adjustment of the resin and wax content to provide a high enough melting point hot melt, which has a sharp enough viscosity curve to allow application at 200° F. A further essential requirement is to maintain adhesive levels at least equivalent to those of traditional hot melts; increasing wax content tends to reduce the adhesive values of most hot melts.

The application temperature of traditional hot melts reduces hot-melt viscosities to a level which is low enough to ensure wetting of substrates to which the adhesive is applied. When melt viscosity increases, the level of wetting is generally lowered. Some substrates act as heat sinks, taking heat away from the applied hot melt very quickly and consequently raising its viscosity. Materials, such as metals, are examples of such substrates. The higher the application temperature, the faster this occurs (i.e. with a large delta temperature there is a fast heat loss and poorer wetting due to increased viscosity). When bonding metals, preheating their surfaces is generally recommended to decrease the delta temperature. On the other hand, certain substrates (e.g. styrofoam and P/E) are sensitive to heat or act as insulators. When heat-sensitive substrates are bonded, they may melt at normal hot-melt application temperatures (350° to 400° F. or 177° to 204° C.) Some substrates (e.g. foam-based products and some paper products) act as insulators; they extend the open time of most hot-melt adhesives to from two to three minutes. Under these conditions, the speed advantage of hot-melt application is eliminated.

Cool-melt glue formulations address and solve these problems by lowering the delta temperature on those substrates that act as heat sinks. This results in more consistent bonds for such substrates. The lower application temperature of cool-melt glue formulations also reduces or eliminates most problems with heat-sensitive materials.

DETAILS

By using a high-melt-index adhesive polymer, particularly a high-melt-index EVA, it is possible to have hot-melt ("cool-melt") glue compositions without an unacceptably high viscosity at application temperature. The high-melt-index adhesive polymer serves as a flexible backbone for the cool-melt-glue; too little high-melt-index polymer requires inclusion of viscosity-adjusting components which result in a brittle or waxy type of hot melt with, generally, poor cohesive characteristics.

Normally, high-melt-index adhesive polymers are used to modify the viscosity of traditional hot-melt adhesives; they are not used to serve as a backbone for such adhesives because, at a normal application temperature of 350° F. (177° C.), such a hot-melt composition would have too low a viscosity and would thus be uncontrollable. By changing the application temperature to a range of, e.g., from 180° to 250° F. (82° to 121° C.), the viscosity of high-melt-index adhesive polymers is higher and controllable.

However, the use of high-melt-index adhesive polymer as the backbone for hot-melt glue compositions was expected to produce a significant reduction in shear strength and heat resistance, since existing hot-melt glue compositions (based on medium-melt-index adhesive polymers) with their higher melt temperatures and higher molecular-weight polymer barely exceeded 200 psi in adhesive tensile and 140° F. (60° C.) in heat resistance (with a dead hanging weight generating a 2 psi load, of 2 pounds) acting on a 1 sq. in. area.

As high-melt-index adhesive polymer EVA polymers are preferred, e.g. those having up to 29 percent by weight of vinyl acetate (VA), particularly those having from 18 to 19 or 27 to 29 percent by weight of units derived from vinyl acetate. Other high-melt-index adhesive polymer, such as high-melt-index polyethylene (P/E), polypropylene, polyester and polyamide, is alternatively employed in place of or in combination with high-melt-index EVA polymer.

Examples of high-melt-index polymers are "Escorene" (trademark of Exxon Chemicals) EX-170 and MVO2514; "Petrothene" (trademark of U.S.I. Chemicals) NA 601-00/04, NA 603-04, NA 605-04, NA 80905 and NA 80733 (polyethylene resin); "Ultrathene" (trademark of U.S.I. Chemicals) UE 647-35, UE 89299, UE 89316, UE 89309 and UE 89297; and DuPont's EP 4969-2W.

In formulating lower-application-temperature (cool melt) hot-melt glue compositions, the high-melt-index adhesive polymer is admixed with tackifying resin and/or wax and, optionally, medium and/or low-melt-index adhesive. The tackifying agents, waxes and medium to low melt-index adhesive resins include all those conventionally used in traditional high-application-temperature hot-melt glue compositions.

Tackifying agents are generally resins derived from several types of materials, such as gum rosin, hydrocarbon resin, polymerized resin and rosin esters. Their melting points normally range from 150° to 250° F. (65.6° to 121.1° C. ) Typical tackifying resins are "Escorez" (trademark of Exxon Chemicals) tackifying resins, "Zonatac" (trademark of Arizona Chemical Company) modified terpine resins and "Wingtack 86" (trademark of The Goodyear Tire & Rubber Company). Examples of waxes are polyethylenes, such as Polywax ® 500 (trademark of Petrolite) and Elvax ® (trademark of DuPont Company) resins.

A typical composition based on high-melt-index (high M.I.) adhesive polymer is as follows:

| EVA (high M.I.) | 20–80 parts by weight |
| --- | --- |
| EVA (med./low M.I.) | 0–15 parts by weight |
| Tackifying resin | 0–60 parts by weight |
| Wax | 0–40 parts by weight |
| Viscosity range at 200° F. | 0.5–4,000 poise |
| Heat Resistance-2 psi | 110°–150° F. (43°–66° C.) |
| Ring and Ball Melt Point | 150°–240° F. (66°–116° C.) |
| Low Thin Film Cracking Temperature | 10°–40° F. (−12°–4° C.) |

No medium or low melt index adhesive polymer need be present to obtain a low temperature hot-melt glue composition. By using a high-melt-index polymer adhesive, such as a high-melt-index EVA, useful low temperature hot-melt and/or glue stick formulations are obtained with high percentages of adhesive polymer and without unacceptably high viscosity at significantly lower application temperatures. The high-melt-index polymer serves as flexible backbone for the low temperature hot-melt adhesive; too little polymer adhesive (in such formulations) results in a brittle or waxy type of hot melt with generally poor cohesive characteristics.

| Exemplary Composition | |
| --- | --- |
| UE 89299 (EVA M.I. 2500) | 40 parts by weight |
| Escorene ® XS 68.16 (EVA M.I. 450) | 8 parts by weight |
| Wingtack ® 86 (tackifier) | 40 parts by weight |
| Polywax ® 500 (wax) | 10 parts by weight |
| Escorez ® 5300 | 2 parts by weight |

The purpose of the medium melt index (EVA) is to provide more body to the adhesive. Similarly, the medium-melt temperature (221° F.; 105° C.) resin adds to the heat resistance of the composition. The resulting adhesive performance is as follows:

| Shear Tensile | pine/pine | 447 psi | (ASTM-D638-68) |
| --- | --- | --- | --- |
| | cold roll steel | 432 psi | |
| Adhesive Tensile | G-10 phenolic | 288 psi | (ASTM D-1002 modified) |
| | rigid PVC | 62 psi | |
| | ABS | 93 psi | |
| | nylon | 163 psi | |
| | polycarbonate | 152 psi | |
| | polypropylene | 153 psi | |
| | high density P/E | 56 psi | |
| | styrene | 61 psi | |
| | pine | 158 psi | |
| | cold roll steel | 299 psi | |
| Ring and Ball Melt Temperature | | 192° F. (89° C.) | |
| Low Thin Film Cracking Temp. | | 30° F. (−1° C.) | |
| Viscosity at 200° F. (93° C.) | | 86 poise | |

Hot-melt formulations are alternatively compounded with various other high-melt-index polymers. Varying the vinyl acetate content makes significant changes in characteristics of a high-melt-index polymer, which advantageously has up to 29 percent by weight of vinyl acetate units, but need not have any of such units. Polymer polarity is normally reduced with a reduction in vinyl acetate content, but such reduction is at least partially offset by a higher tackifier content in the formulation. High-melt-index polyethylenes (P/E) or other zero percent vinyl acetate polymers tend to be waxy and have low film tensile strength unless accompanied by low-melt-index P/E plus wax and/or tackifier to lower viscosity at application temperature.

Melt indices of illustrative high-melt-index adhesive polymers are:

| Product | Polymer | % Vinyl Acetate | Melt Index (M.I.) |
| --- | --- | --- | --- |
| UE 89309 | EVA | 13 | 2500 |
| UE 89297 | EVA | 18 | 2500 |
| UE 89316 | EVA | 25 | 2500 |
| UE 89299 | EVA | 29 | 2500 |
| UE 647-35 | EVA | 28 | 950 |
| EP 4969-2W | EVA | 28 | 800 |
| Escorene ® MV02514 | EVA | 19 | 2500 |
| NA 601-00/04 | P/E | 0 | 2000 |
| NA 603-04 | P/E | 0 | 2000 |
| NA 605-04 | P/E | 0 | 4000 |
| NA 80905 | P/E | 0 | 20000 |
| NA 80733 | P/E | 0 | 2000 |

The preferred cool melt glue compositions are those which have sharp viscosity profiles (a decrease in viscosity from 14,000 to 5,000 cp or less over a temperature range from 185° to 285° F.) The preferred high-melt-index polymer adhesives (for cool melt glue compositions) are those which have a crystallinity of about 20% and a melting point in the range of from about 160° to 215° F.

The invention and its advantages are readily understood and appreciated from the preceding description. Various changes may be made in the composition, in the product and in the respective methods without departing from the spirit and scope of the invention or sacrificing its material advantages. The compositions, products and methods hereinbefore described are merely illustrative of preferred embodiments of the invention.

What is claimed is:

1. In a plural component hot-melt adhesive composition having hot-melt adhesive polymer as its backbone, the improvement wherein the backbone adhesive polymer is polymer having a melt index in excess of 750 g/10 min. and the composition has an application temperature below or about 280° F.

2. A hot-melt adhesive composition of claim 1 which is suitable for a glue gun glue stick and which
   (a) has a heat resistance of at least 125° F.,
   (b) has an application temperature of about 280° F. or less when in glue gun glue stick form
   (c) has acceptable bond strength,
   (d) does not soften at ambient temperature,
   (e) has hot-melt adhesive as its sole essential adhesive component.

3. A plural component hot-melt adhesive composition of claim 2 which has a heat resistance of at least 125° F., a bond-strength profile at least equivalent to that of traditional hot-melts, a Shore "A" hardness durometer reading at ambient temperature of from 50 to 100, hot-melt adhesive as its sole essential adhesive component, and a viscosity profile sharp enough to allow an application temperature within the range of from 180° to 280° F. when in glue gun glue stick form.

4. A hot-melt adhesive composition having an application temperature in an approximate range of from 180° to 250° F. and comprising an admixture of a) adhesive polymer having a melt index in excess of 750 g/10 min. with at least one member selected from the group consisting of b) tackifying resin and c) wax, the composition having from 20 to 80 parts by weight of (a), up to about 60 parts by weight of (b) and up to about 40 parts by weight of (c).

5. A hot-melt adhesive composition of claim 4 which further comprises up to 40 parts by weight of adhesive polymer having a melt index which is less than about 650 g/10 min.

6. A hot-melt adhesive composition of claim 4 which is suitable for use as a glue-stick composition and wherein the melting point of each component does not exceed 330° F.

7. A hot-melt adhesive composition of claim 4 having a viscosity at 200° F. of from 500 to 80,000 cp, heat resistance under a load of 2 pounds in the range of from 110° to 150° F., a ring and ball melting point in the range of from 150° to 240° F., and a thin-film cracking temperature in the range of from 0° to 40° F.

8. A hot-melt adhesive composition of claim 3 wherein (a) is an ethylene polymer having from 0 to 29 percent by weight of monomer units derived from vinyl acetate.

9. A hot-melt adhesive composition of claim 7 wherein (a) is an ethylene/(vinyl acetate) polymer having a vinyl acetate monomer content of from 18 to 19 percent by weight or from 27 to 29 percent by weight.

10. A composition of claim 1 wherein the backbone adhesive polymer comprises an EVA polymer having a melt index in excess of 750 g/10 min.

11. A composition of claim 1 wherein the backbone adhesive polymer comprises polyethylene having a melt index in excess of 750 g/10 min.

12. A composition of claim 1 wherein the backbone adhesive polymer comprises polypropylene having a melt index in excess of 750 g/10 min.

13. A hot-melt adhesive composition of claim 1 having a viscosity profile sharp enough to allow an application temperature of 200° F.

14. A plural-component hot-melt adhesive composition of claim 1, an essential polymeric component of which is a high-melt-index polymer selected from the group consisting of an EVA polymer, polyethylene and polypropylene, the composition being one which (a) has a heat resistance (under a load of two pounds) of at least 125° F., (b) has a bond strength profile at least equivalent to that of traditional hot melts, (c) does not soften at ambient temperature, and (d) has a viscosity profile which is sharp enough to allow a glue gun glue stick application temperature within the range of from 180° to about 280° F.

15. A hot-melt adhesive composition of claim 14 which comprises an amount of adhesive polymer having a melt index of less than about 650 g/10 min., the amount being up to 40 parts by weight.

16. A hot-melt adhesive composition of claim 14 wherein the essential polymeric component has a melt index in excess of about 2,000 g/10 min.

17. A hot-melt adhesive composition of claim 14 which has a Shore "A" hardness durometer reading at ambient temperature of from 50 to 100.

18. A hot-melt adhesive composition of claim 14 which has a ring and ball melting point in the range of from 150° to 240° F. and has a film cracking temperature in the range of from 0° to 40° F.

19. A hot-melt adhesive composition of claim 14, each component of which has a melting point which does not exceed 330° F.

20. A hot-melt adhesive composition of claim 14 wherein the essential polymeric component is an EVA polymer.

21. A hot-melt adhesive composition of claim 14 wherein the essential polymeric component is polyethylene.

22. A hot-melt adhesive composition of claim 14 wherein the essential polymeric component is polypropylene.

23. A hot-melt adhesive composition of claim 14 wherein the essential polymeric component is an ethylene polymer having from 0 to 29 percent by weight of monomer units derived from vinyl acetate.

24. A hot-melt adhesive composition of claim 14 wherein the essential polymeric component is an ethylene/(vinyl acetate) polymer having a vinyl acetate monomer content of from 18 to 29 percent by weight.

25. A hot-melt adhesive composition of claim 14 comprising an admixture of (a) the essential polymeric component with at least one member selected from the group consisting of (b) tackifying resin and (c) wax, the admixture having from 20 to 80 parts by weight of (a), up to about 60 parts by weight of (b) and up to about 40 parts by weight of (c), based on 100 parts by weight of the composition.

* * * * *